United States Patent
Mehas et al.

(10) Patent No.: US 11,804,737 B2
(45) Date of Patent: Oct. 31, 2023

(54) UNIVERSAL WIRELESS CHARGING SURFACE

(71) Applicant: Renesas Electronics America Inc., Milpitas, CA (US)

(72) Inventors: Gustavo Mehas, Mercer Island, WA (US); Laurence McGarry, Milpitas, CA (US)

( * ) Notice: Subject to any disclaimer, the term of this patent is extended or adjusted under 35 U.S.C. 154(b) by 164 days.

(21) Appl. No.: 17/241,400

(22) Filed: Apr. 27, 2021

(65) Prior Publication Data

US 2021/0376667 A1 Dec. 2, 2021

Related U.S. Application Data (60) Provisional application No. 63/032,441, filed on May 29, 2020.

(51) Int. Cl.
*H02J 50/90* (2016.01)
*H02J 50/40* (2016.01)
*H02J 50/10* (2016.01)

(52) U.S. Cl.
CPC .............. *H02J 50/90* (2016.02); *H02J 50/10* (2016.02); *H02J 50/402* (2020.01); *H02J 2310/22* (2020.01)

(58) Field of Classification Search
CPC ...................................................... H02J 50/90
USPC ........................................................ 320/108
See application file for complete search history.

(56) References Cited

U.S. PATENT DOCUMENTS

| | | | |
|---|---|---|---|
| 10,270,298 B1* | 4/2019 | Gupta | G06F 16/9537 |
| 2013/0026981 A1* | 1/2013 | Van Der Lee | H02J 50/10 |
| | | | 320/108 |
| 2013/0049482 A1* | 2/2013 | Rote | H02J 50/12 |
| | | | 307/104 |
| 2020/0203995 A1* | 6/2020 | Osada | H02J 50/402 |
| 2020/0274404 A1* | 8/2020 | Sankar | H02J 50/40 |

* cited by examiner

*Primary Examiner* — Edward Tso
*Assistant Examiner* — Ahmed H Omar
(74) *Attorney, Agent, or Firm* — HAYNES AND BOONE, LLP (57) ABSTRACT

According to some embodiments, a wireless power transmitter is presented. In some embodiments, a wireless power transmitter includes a charging table; a plurality of movable transmitter coils incorporated into the charging table; and a control circuit coupled to sensors in the charging table and to the plurality of movable coils. In some embodiments, the control circuit is configured to detect a device placed on the charging table, determine a position of the device, move at least one of the plurality of movable transmitter coils to engage the device, communicate with the device to determine device characteristics, further configure the plurality of movable coils to engage with the device, and engage the device according to the device characteristics.

19 Claims, 8 Drawing Sheets

Figure 11

UNIVERSAL WIRELESS CHARGING SURFACE

RELATED APPLICATION

The present disclosure declares priority to U.S. Provisional Application 63/032,441, entitled "Universal Wireless Charging Surface," filed on May 29, 2020, which is herein incorporated by reference in its entirety.

TECHNICAL FIELD

Embodiments of the present invention are related to wireless transmission of power and, in particular, to a universal wireless charging surface.

DISCUSSION OF RELATED ART

Mobile devices, for example smart phones, tablets, wearables and other devices are increasingly using wireless power charging systems. In general, wireless power transfer involves a transmitter driving a transmit coil and a receiver with a receiver coil placed proximate to the transmit coil. The receiver coil receives the wireless power generated by the transmit coil and uses that received power to drive a load, for example to provide power to a battery charger.

There are multiple different standards currently in use for the wireless transfer of power. The most common standard for wireless transmission of power is the Wireless Power Consortium standard, the Qi Standard. Under the Wireless Power Consortium, the Qi specification, a magnetic induction coupling system is utilized to charge a single device that is coupled through the receiver coil circuit. In the Qi standard, the receiving device coil is placed proximate to the transmission coil. Alternate or amended standards may allow the receiving device coil to be placed near the transmitting coil, potentially along with other receiving coils that belong to other charging devices.

Typically, a wireless power system includes a transmitter coil that is driven to produce a time-varying magnetic field. A receiver coil, which can be part of a device such as a cell phone, PDA, computer, or other device, is positioned relative to the transmitter coil to receive the power transmitted by the time-varying magnetic field produced by the transmitter coil.

Some wireless power transmitters include multiple transmission coils that can be arranged in an area to create larger charging areas. However, arrangement of coils that provide power to a wide diversity of devices that are randomly positioned on a large charging area can be difficult.

Therefore, there is a need to develop improved ways to arrange wireless power transmit coils to accommodate more devices.

SUMMARY

According to some embodiments, a wireless power transmitter is presented. In some embodiments, a wireless power transmitter includes a charging table; a plurality of movable transmitter coils incorporated into the charging table; and a control circuit coupled to sensors in the charging table and to the plurality of movable coils. In some embodiments, the control circuit is configured to detect a device placed on the charging table, determine a position of the device, move at least one of the plurality of movable transmitter coils to engage the device, communicate with the device to determine device characteristics, further configure the plurality of movable coils to engage with the device, and engage the device according to the device characteristics.

A method of operating a wireless power transmitter according to some embodiments includes detecting a device placed on a surface of a charging table; determining a position of the device; moving at least one of a plurality of movable transmit coils that are incorporated in the charging table to engage the device; communicating with the device to determine device characteristics; configuring the plurality of movable transmit coils relative to the device according to the device characteristics; and engaging the device according to the device characteristics.

These and other embodiments are discussed below with respect to the following figures.

These figures are further discussed below with respect to the detailed description.

DETAILED DESCRIPTION

In the following description, specific details are set forth describing some embodiments of the present invention. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure.

This description illustrates inventive aspects and embodiments should not be taken as limiting—the claims define the protected invention. Various changes may be made without departing from this disclosure and the claims. In some instances, well-known structures and techniques have not been shown or described in detail in order not to obscure the inventive aspects of the disclosure.

A wireless power transmitter can include a charging surface on which receive devices are placed with placement freedom. A plurality of movable coils incorporated into the charging surface. A controller coupled the charging surface and the plurality of movable coils executes instructions to detect a receiver placed on the charging surface, determine a position of the receiver, determine receiver requirements, configure the plurality of movable coils to provide wireless power according to the receiver requirements, and transfer wireless power with the receiver.

Figure 1:
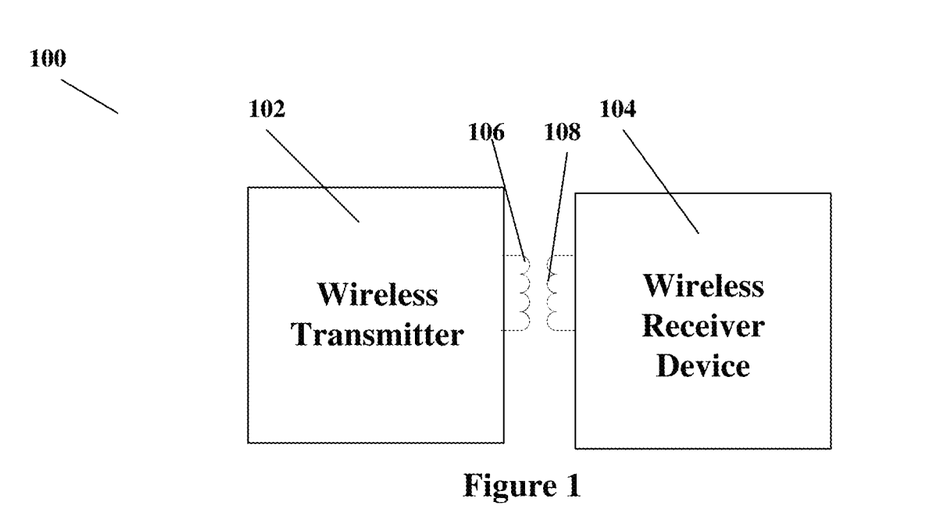
FIG. 1 illustrates a wireless power transmission system on which embodiments of the present disclosure can be implemented.

FIG. 1 illustrates an example wireless power transmission system 100 and may represent some embodiments of the present disclosure. As illustrated in FIG. 1, a wireless transmitter 102 is coupled to a transmitter coil 106 and a wireless receiver 104 is coupled to a receiver coil 108. Transmitter coil 106 is driven by wireless transmitter 102 to produce a time varying magnetic field that in turn induces a current in receiver coil 108. Receiver coil 108 is coupled to wireless receiver 104, which can receive the power transmitted through the time varying magnetic field from wireless device 102.

Wireless receiver 104 can be any device with wireless power functions. Many phones, laptops, tablets, wearable devices, and other devices include a wireless power function. In some cases, these devices can both receive and transmit wireless power.

In some examples of the present disclosure, wireless transmitter 102 may be a stationary wireless power charger. In accordance with some embodiments of the present disclosure, wireless power transmitter 102 includes a plurality of transmission coils, at least one of which is mobile. The mobile transmission coil can be moved to accommodate various charging situations, as is described in further detail below. In particular, a wireless transmitter detects a receiver placed in a random location on a charging surface (e.g., table), determines the location and requirements of the receiver, and moves one or more of the charging coils proximate to the receiver to accommodate those requirements.

End users desire a transparent wireless charging experience for all their portable devices. An ideal application is to place a laptop, phone and/or earbuds case/wearable anywhere on a table (free placement) and to have these devices charge wirelessly without user input or alignment. Laptops commonly require +100 W, phones typically require up to 40 W, and wearables/earbuds typically require ~5 W, posing a power delivery challenge for free placement of devices on the table. Further, laptops, phones and wearables/earbuds use disparate coil geometries making a single universal transmission coil that is applicable for all types of receiver devices challenging.

Each coil geometry delivers different power levels. As discussed above, laptops may require 100+ W of wireless transmission power, phones may use 20-40 W of transmission power, and wearables may use less than 5 W. Free placement of receiver devices typically requires an array of multiple overlapping coils in a single location or movable coils. Multiple overlapping coils capable of covering a table are cost prohibitive for most consumer applications. Movable coils require an interdisciplinary development team which is lacking in most development centers, and therefore has found little use.

Figure 2:
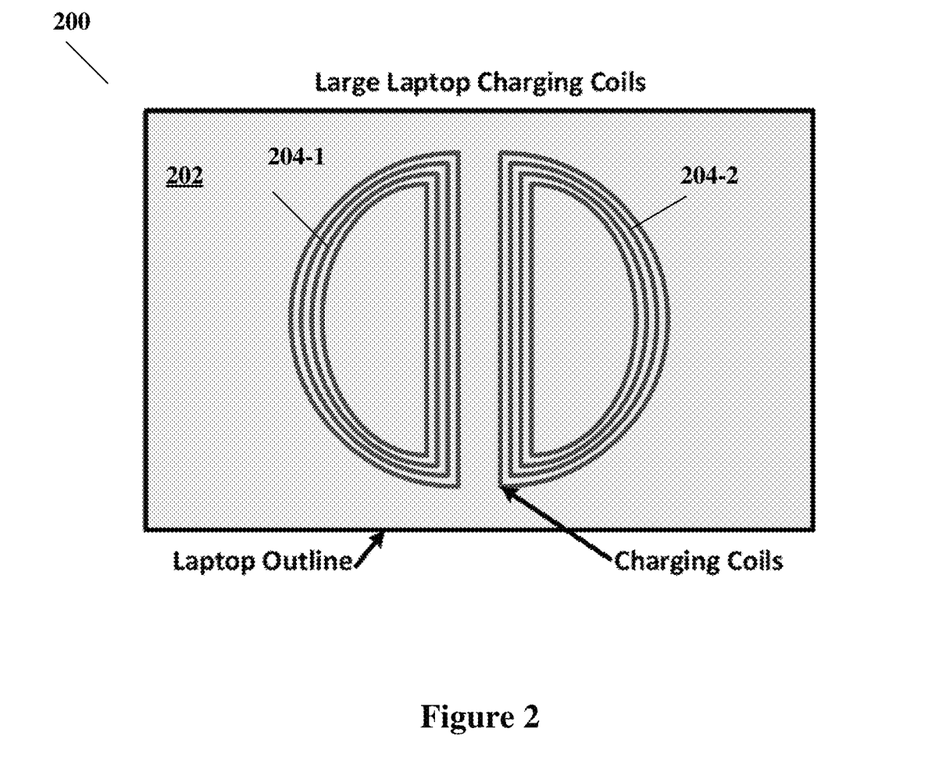
FIG. 2 illustrates a conventional arrangement of transmit coils for charging a large laptop.

FIG. 2 illustrates a table arrangement 200 of transmission coils 204 appropriate for charging a laptop 202, which is shown in FIG. 2 as being placed on the table arrangement 200. As shown in FIG. 2, a laptop 202 has been historically charged with dual large transmit coils 204, shown as D-shaped coils 204-1 and 204-2. As illustrated in FIG. 2, the two large coils 204-1 and 204-2 can be D-shaped coils and placed appropriately within the outline of laptop 202 to charge laptop 202. Transmit coils 204-1 and 204-2 are in a fixed location and require the end user to align laptop 202 precisely for efficient power transfer. The Dell Latitude 7285, for example, uses such a configuration. However, these large charging coils 204 are not usually compatible with charging phones, wearables, or other portable devices. Those devices are more efficiently charged with other transmitter coil configurations.

Figure 3:
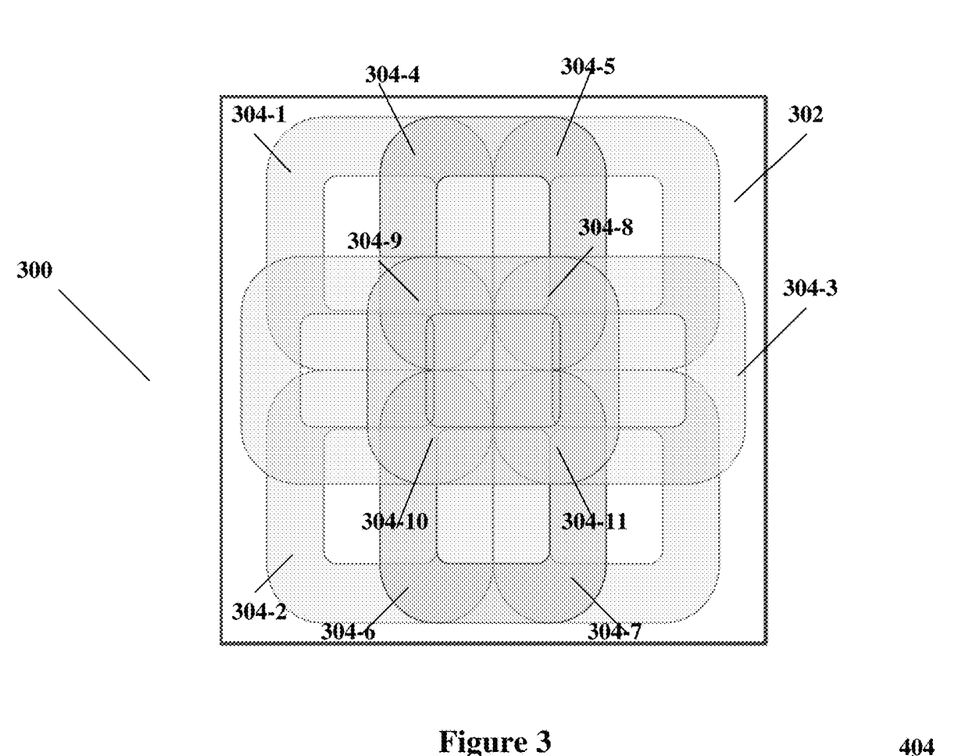
FIG. 3 illustrates a conventional arrangement with overlapping transmitter coils.

Earbuds/wearables and phones have been charged with charging table configuration 300 with an overlapping transmission coil array 302 as illustrated in FIG. 3. As illustrated in FIG. 3, transmission coil array 302 includes horizontally oriented elongated coils 304-1 and 304-2 with a horizontally oriented elongated coil 304-3 that overlays and is centered on coils 304-1 and 304-2. Vertically oriented elongated coils 304-4 through 304-7 can be positioned and centered in an overlapping fashion and centered on coils 304-1 through 304-3. In the example illustrated in FIG. 3, vertically elongated coils 304-4 and 304-6 are positioned end-to-end and arranged beside elongated coils 304-7 and 304-8, which themselves are arranged end-to-end. Additionally, small circular coils 304-8 through 304-10 can be arranged in the center. Consequently, a large area of a table 300 can be serviced with one or more of these overlapping coils. In some embodiments, a controller (not shown) can detect the presence of a device on table 300 and determine which of transmitter coils 304 to activate to charge the device. Large fixed coil arrays such as coil array 302 illustrated in FIG. 3 are supported in the WPC Qi specification.

Figure 4:
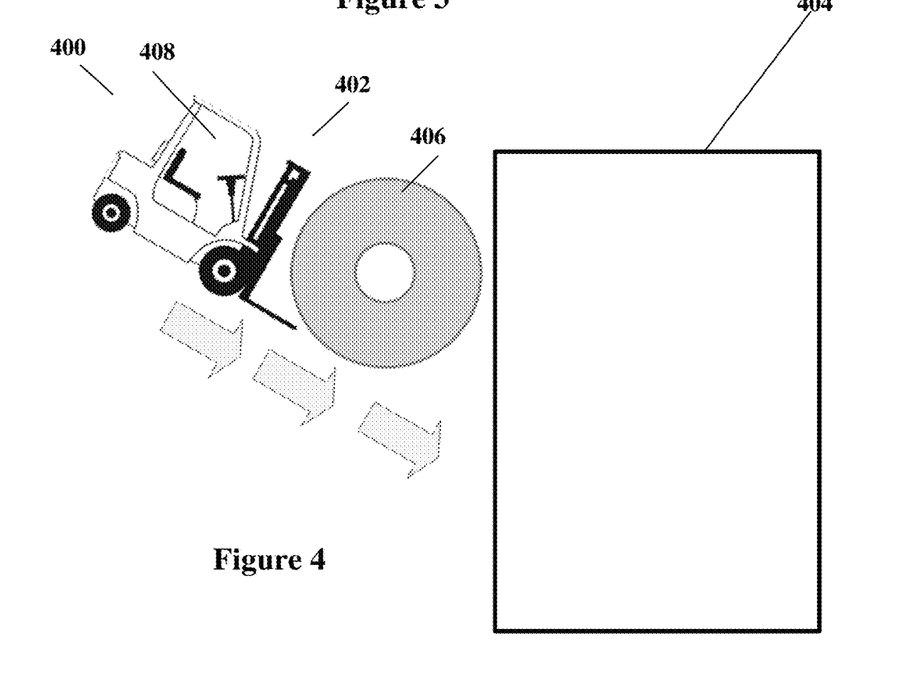
FIG. 4 illustrates an example of a moveable coil.

FIG. 4 illustrates an example table 400 with a single moving coil 402 to gain some degree of free-positioning, for example for charging phone 404. For illustrative purposes, in this disclosure a movable coil such as single moving coil 402 is depicted as a circular coil 406 being moved by a forklift symbol 408. A moving common coil structure 402 as illustrated in FIG. 4 has been used by Panasonic to increase an XY area. Some solutions do use a single hybrid coil to charge a phone or a wearable WPD's TRx solution. However, to date none of these solutions are satisfactory for a charging table with a free placement solution for multiple types of devices.

Figure 5A:
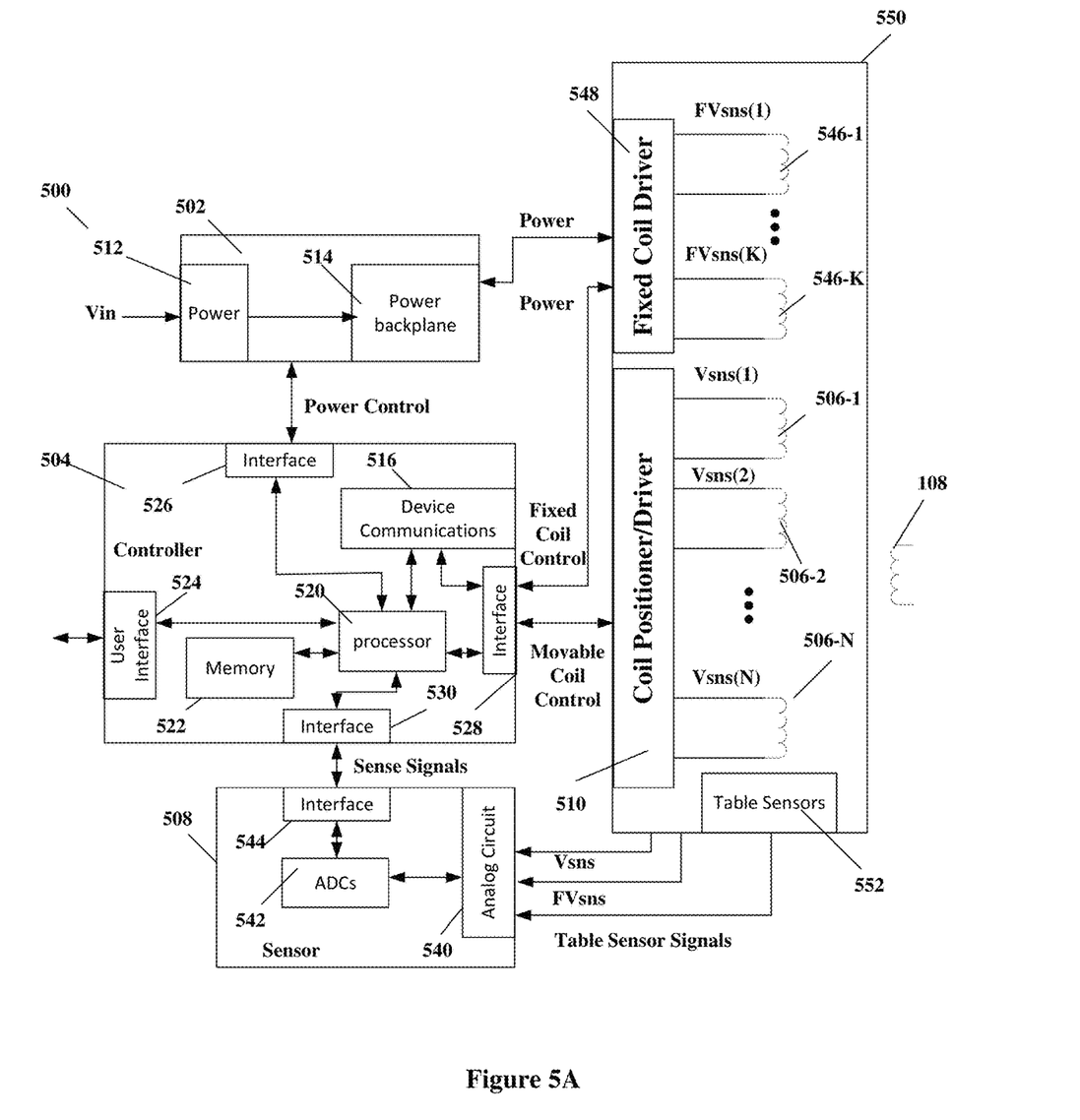
FIGS. 5A, 5B, and 5C illustrate a block diagrams of some embodiments of a wireless power transmitter according to the present disclosure.
Figure 5B:
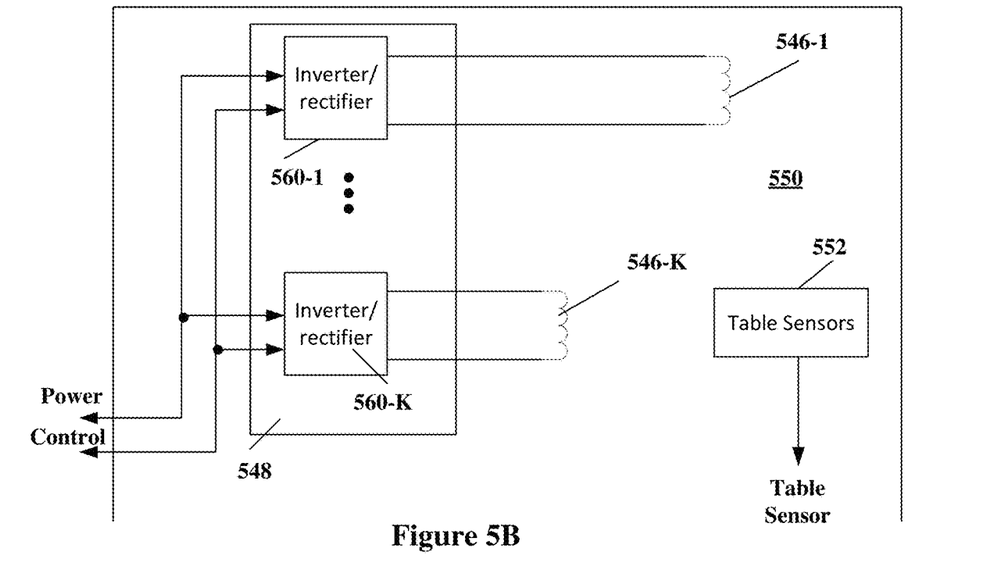
Figure 5C:
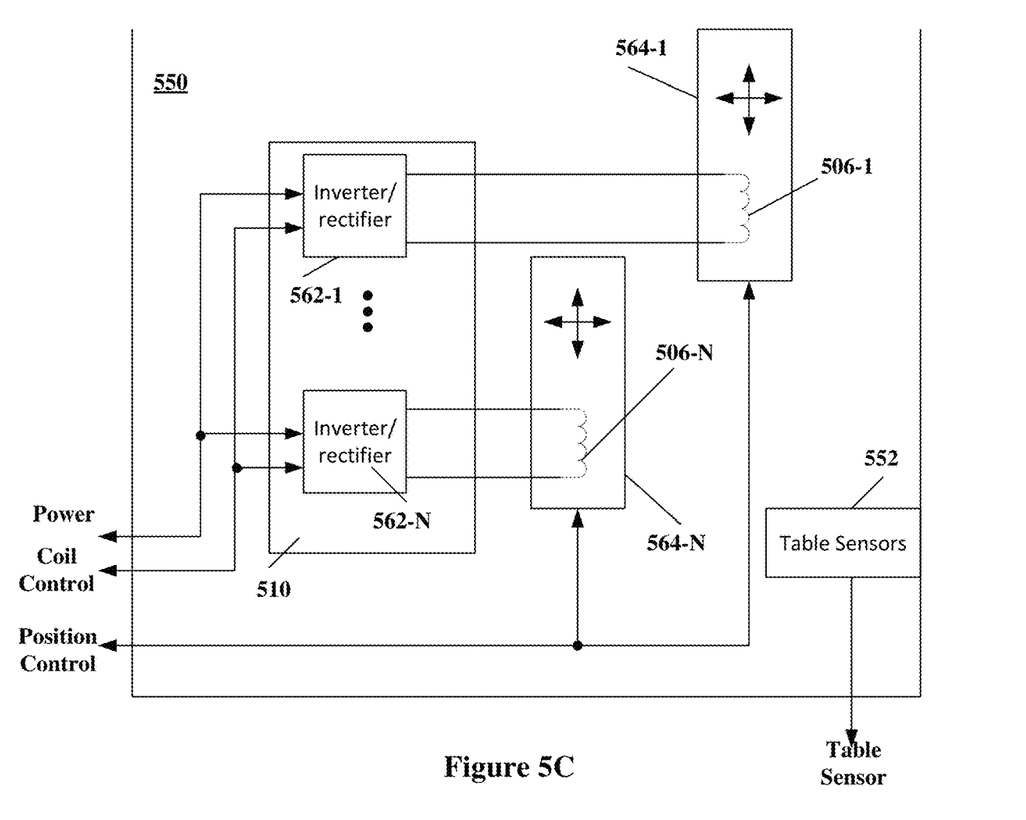

FIGS. 5A-5C illustrate embodiments of a wireless power transmitter 500 with a plurality of movable coils 506-1 through 506-N (N≥2) according to the present disclosure. As is illustrated in FIG. 5A, transmitter coils 506-1 through 506-N are coupled to a coil positioner and driver 510. Coil positioner and driver 510 is coupled to receive power to drive selected ones of transmitter coils 506-1 through 506-N and controls the positioning of transmitter coils 506-1 through 506-N within a table 550. Transmission coils 506-1 through 506-N are positioned in a charging table 550 and have a range of motion within table 550 that allows wireless power transfer to a device that is placed on the table.

Although coils 506-1 through 506-N represent a plurality of movable transmitter coils to allow movement of coils to be positioned on the table 550 as controlled by coil positioner and driver 510, in some embodiments one or more fixed coils 546-1 through 546-K (K an integer ≥0) can also be fixed in place within the table 550. As illustrated in FIG. 5A, fixed coils 546-1 through 546-K can be driven by fixed coil driver 548. The fixed in place coils 546-1 through 546-K in table 550 can be used for a variety of purposes, including to help with table top mechanical support.

Coil positioner and driver 510 can position moveable transmit coils 506-1 through 506-N within table 550 and direct power to one or multiple ones of movable coils 506-1 through 506-N according to the movable coil control signals. In particular, coil positioner and driver 510 can position a plurality of movable transmit coils 506 appropriately and drive those coils electrically to charge a device placed on the charging surface of table 550. Coil positioner and driver 510 also drives activated ones of the movable coils 506-1 through 506-N once they are positioned appropriately to charge the device. Fixed coil block 548 can control and drive fixed coils 546-1 through 546-K, if present. Fixed coils 546 can be used in cooperation with movable coils 506-1 through 506-N to charge a device that is positioned at a random position on the surface of table 550.

As is illustrated in FIG. 5A, power to fixed coil driver 548 and coil positioner and driver 510 is provided by a power source 502. Power source 502 includes a power converter 512, which receives an input voltage Vin and provides a voltage to power backplane 514. Power backplane 514 can provide power to fixed coil driver 548 and to coil positioner and driver 510. In some embodiments, power backplane 514 can include a single inverter/rectifier circuit to drive multiple ones of coils, as controlled by coil positioner/driver 510 and fixed coil driver 548. In accordance with these embodiments, power backplane 514 can include one or more half-bridge or full-bridge devices to provide or receive power signals to coil positioner 510 and to fixed coil block 548 powering one or more transmitter coils (i.e. fixed coils 546-1 through 546-K and moveable transmission coils 506-1 through 506-N) simultaneously as needed. However, as is discussed further below, fixed coil driver 548 and coil positioner and driver 510 can include individual inverter/rectifier circuits to drive individual coils, where each of the individual inverter/rectifier circuits is provided with power from power backplane 514 or supplies power to power backplane 514. The input voltage Vin to power converter 512 can be from any power source, for example 110 VAC or a DC voltage, which is sufficient to drive the wireless power transmitter 500. In some examples, sufficient power may be received into power backplane 514 to drive other coils without input voltage Vin.

As discussed above, in some embodiments power backplane 514 may receive power from a subset of movable transmit coils 506 or fixed transmit coils 546 and provide that power to other ones of movable transmit coils 506 or fixed transmit coils 548. In that case, one or more of coils 506-1 through 506-N can be reconfigured to receive power from a source that transmits wireless power to them. In that case, wireless power transmitter can control coil positioner and driver 510 to facilitate transfer of power from one device that transmits power to the subset of power receiving coils to another receiver that is coupled to other ones of transmit coils 506 or 546 to receive power.

Coil positioner driver 510, fixed coil driver 548, and power source 502 are coupled to a controller 504. Power source 502 can be coupled to controller 504 through an interface 526. Controller 504 provides control signals that determine the output power levels and frequency of the power signals from power source 502 to coil positioner and driver 510 and to fixed coil driver 548. Controller 504 determines a subset of coils 506-1 through 506-N to be positioned and powered from power source 502 to service a receiver 104 placed on a table 550 in which coils 506-1 through 506-N and coils 546-1 through 546-K are mounted. The positioning of receiver coil 108 on table 550 can be determined by detecting magnetic field strengths as detected at coils 506-1 through 506-N and coils 546-1 through 546-K and other sensors that are mounting in charging table 550. These sensors 552 can be used to detect the presence of a device placed on table 550 or that can track the positioning of each of movable transmit coils 506-1 through 506-N.

Controller 504 can be any circuit or set of circuits capable of carrying out the processes discussed in this disclosure. As such, in some embodiments controller 504 can include a processor 520 coupled to a memory 522. Processor 520 can be any processor, for example a microcomputer, microcontroller, microprocessor, or other processing circuit. Memory 522 can include a combination of volatile and non-volatile memory such that processor 520 can execute instructions stored in memory 522 and store and retrieve data in memory 522. Processor 520 is further coupled to an interface 528 that allows controller 504 to communicate with coil positioner and driver 510 and with fixed coil driver 548.

As is further illustrated in FIG. 5A, controller 504 can further include device communications 516. Device communications 516 can be coupled to processor 520 and, through interface 528, to fixed coil driver 548 and coil positioner and driver 510. Device communications 516 can arrange communication with a device placed on table 550 by modulating demodulating data signals on the power signals positioned to interact with that device. In a configuration where the device is a wireless power receiver device, device communications 516 can control transmission of data from controller 504 to the device by modulating the frequency of the power signals while the corresponding receiver device can transmit data to controller 504 by modulating a load on the received wireless power signal. In a configuration where the device is a wireless power transmitter device that supplies power to power backplane 514, then device communications 516 transmit data to the device by amplitude modulation on the wireless power signal (e.g. modulating a load) and receives data from the device by demodulating a frequency modulation on the wireless power signal. Consequently, a positioned device can be queried to provide device type and device power parameters to determine positioning and operation of coils 506-1 through 506-N to service that device.

Device communications 516 can also be used to detect the magnetic field strength at a device by sensing the incoming induced voltage (FVsns or Vsns) and thus can be used to determine position of receiver 104, from which the positions of coils 506-1 through 506-N and 546-1 through 546-K relative to the device placed on table 550 can be determined.

Processor 520 is further coupled to an interface 530 that allows processor 520 to communicate with a signal sensor 508. Further, a user interface 524 may be coupled to processor 520. User interface 524 may provide communications with a user of transmitter 500, including direct connection to user input and display devices as well as wireless communications (e.g., Bluetooth, wifi, or other wireless standards) to a wireless device brought proximate to transmitter 500.

As illustrated in FIG. 5A, controller 504 is coupled to sensor block 508 to receive signals related to the location of a receiver coil 108 that has been placed close to the table. In particular, signals from each of transmit coils 546-1 through 546-K (FVsns(1)-FVsns(K)) and movable transmit coils 506-1 through 506-N (Vsns(1)-Vsns(N)) can be received into an analog circuit 540. Further, additional table sensor signals can be received from other sensors embedded in table 550, designated as table sensors 552. Analog circuit 540 can provide analog filtering and amplification before the signals are digitized in analog-to-digital converter 542. The digitized signals are read by controller 504 through interface 530 of controller 504, which is coupled to interface 544 of signal sensor 508. In some cases, signal sensor 508 may be part of a demodulation filter incorporated in device communications 516. As such, sensor block 508 can monitor each of fixed coils 546-1 through 546-K and transmit coils 506-1 through 506-N to detect levels of power transmission as well as the presence of additional devices being placed on the charging table that houses the transmit coils from table sensors 552. In some embodiments, signals from the transmit coils can be used to determine the presence of a foreign object, which is not a receiver device but will detrimentally absorb transmitted wireless power.

In some embodiments, controller 504, power converter 502, and sensor 508 are all formed as a single circuit, and possibly a single integrated circuit, that is incorporated with table 550. As described above, transmitter 500 determines the location of receiver coil 108 positioned on the surface of table 550, which houses movable transmit coils 506 and fixed transmit coils 548 (if any), determines from receiver 104 the power requirements of receiver 104, moves a subset of transmit coils 506 to a position relative to receiver coil 108 to service receiver 104, and powers the subset of transmit coils 506 to provide wireless power to receiver 104.

FIG. 5B illustrates operation of fixed coils 546-1 through 546-K in table 550. As illustrated in FIG. 5B, table 550 includes an inverter/rectifier circuit 560 in fixed coil driver 548 for each of coils 546. As illustrated, inverter/rectifier circuit 560-1 through 560-K are coupled to coils 546-1 through 546-K, respectively. Inverter/rectifier circuits 560-1 through 560-K are coupled to receive and provide signals through interface 528. In some embodiments, each of inverter/rectifier circuits 560-1 through 560-K can include modulators and demodulators for transmission of data on the wireless power signal transmitted by or received by each of coils 546-1 through 546-K. As is further illustrated in FIG. 5B, table 550 includes table sensors 552.

FIG. 5C illustrates operation of movable transmit coils 506-1 through 506-N in table 550. As illustrated in FIG. 5B, table 550 includes an inverter/rectifier circuit 562 in coil positioner and driver 510 for each of coils 506. As illustrated, inverter/rectifier circuit 562-1 through 562-N are coupled to coils 506-1 through 506-N, respectively. Inverter/rectifier circuits 562-1 through 562-N are coupled to receive and provide signals through interface 528. In some embodiments, each of inverter/rectifier circuits 562-1 through 562-K can include modulators and demodulators for transmission of data on the wireless power signal transmitted by or received by each of coils 506-1 through 506-N. As is further illustrated in FIG. 5B, table 550 includes table sensors 552 that can provide signals indicating the positions of devices and other objects that are placed on table 550.

Further position control signals from controller 504 are provided to stages 564-1 through 564-N. Coils 506-1 through 506-N are each mounted on one of stages 564-1 through 564-N. Stages 564-1 through 564-N provide motion for coils 506-1 through 506-N in the x-y plane of table 550. In some embodiments, stages 564-1 through 564-N includes x-y translation stages. In some embodiments, stages 564-1 through 564-N includes a rail system that allows translation of coils 506-1 through 506-N through various defined translations. In particular, stages 564-1 through 564-N allow for translation of coils 506-1 through 506-N while avoiding interference between wiring arrangements to coils 506-1 through 506-N and stages 564-1 through 546-N.

Figure 6:
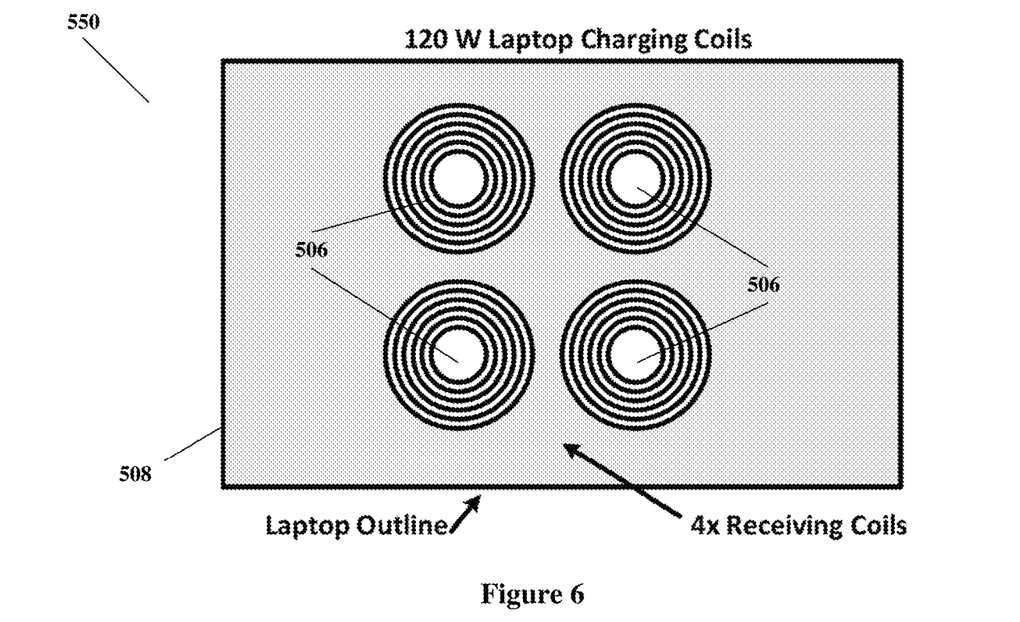
FIG. 6 illustrates charging a laptop with four coils moved to charge the laptop.

FIG. 6 illustrates a table 550 according to some embodiments of the disclosure. In the example illustrated in FIG. 6, a laptop 508 is placed on the surface of table 550, where movable transmit coils 506 have been moved to a position proximate to the laptop 508. Each of movable transmit coils 506 can be configured to be electrically driven in parallel by coil positioner 510 to provide power to laptop 508.

Figure 7:
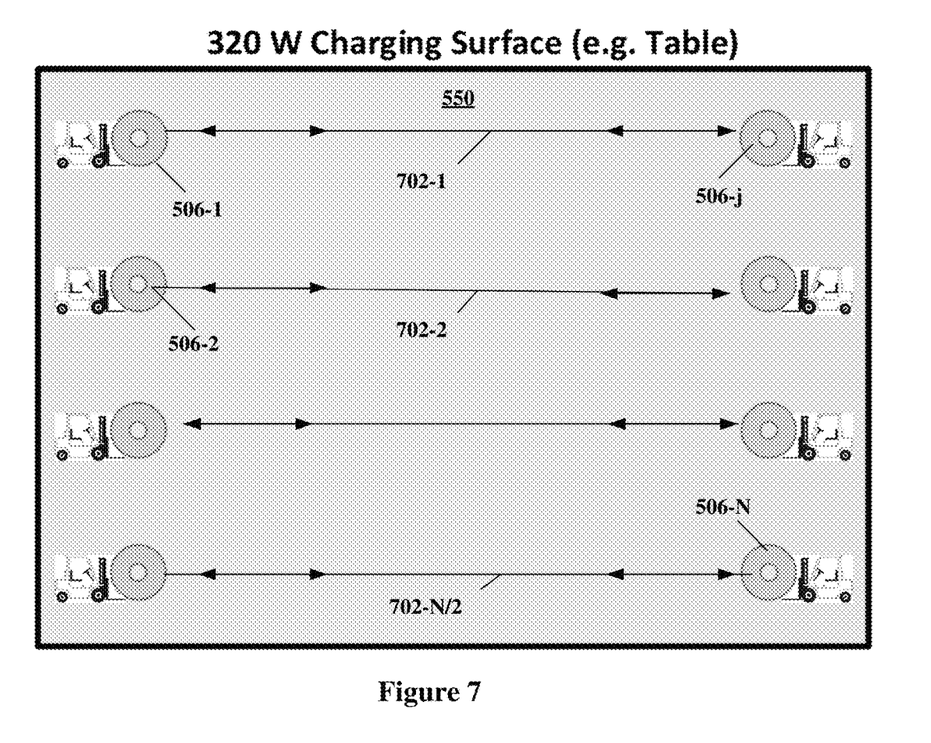
FIG. 7 illustrates a table with an array of moveable coils that can be arranged to charge multiple devices placed at random on the table.

FIG. 7 illustrates an example embodiment of table 550. In the example illustrated in FIG. 7, table 550 includes an array of movable transmit coils 506-1 through 506-N, with no fixed coils 546. As illustrated in FIG. 7, each of movable transmission coils 506-1 through 506-N is arranged to be movable only a vertical path across table 550 on stages 564. As illustrated in FIG. 7, for example, movable transmit coil 506-1 and movable transmit coil 506-j are arranged to travel along a vertical path 702-1. As illustrated, each of vertical paths 702-1 through 702-N/2 includes two movable transmit coils 506 that can travel along the path. In some embodiments, movable transmit coils 506-1 through 506-N can be mechanically mounted and moved along its path 702-1 through 702-N/2 according to signals to stages 564 in coil positioner 510 by controller 504. In some embodiments, at least some of transmit coils 506-1 through 506-N can be mounted on translation stage platforms that allow for both x and y translations. At least some of transmit coils 506-1 through 506-N can be mounted on a stage 564 that allows for x or y translations.

As discussed above, controller 504 receives signals to indicate the position of a device on table 550 and move the appropriate transmit coils to provide wireless power to a device placed on the surface of table 550. For example, as illustrated in FIG. 6, four transmit coils 506 are moved along their paths 702 to position themselves with respect to laptop 508. Movement of transmit coils 506 along their designated paths can be performed by any mechanical drive system that translates transmit coils 506 in the x-y plane according to signals controlled by coil positioner 510. The x-y plane refers to a plane parallel to the surface of table 550, a direction perpendicular to the surface of table 550 being the z axis.

Consequently, FIGS. 6 and 7 illustrate a charging table 550 with a plurality of movable transmit coils 506. The movable transmit coils 506, for example, may include hybrid Phone/Wearable PTx Coils, which are circular coils, although transmit coils 506 can be any transmission coils. Each coil 506-1 through 506-N can operate as an independent transmission coil to transfer power or can be electronically coupled, for example, in a parallel fashion, to transfer power. As shown in FIG. 6, four transmit coils 506 are moved to be positioned appropriately to charge laptop 508. The four transmit coils 506 positioned proximate to laptop 508 are then electrically driven in parallel to affect the wireless power transfer to laptop 508.

Wearables and Phones often utilize existing Qi PRx class coils 108. Phones or Wearables can typically be charged with only one coil of movable transmit coils 506 for charging. Laptops can utilize multiple, parallel coupled PRx Qi PRx coils to achieve the needed power levels (e.g. 160 W laptops would use 4 transmission coils each rated to provide 40 W of power). Transmit coils 506 can re-position during charging for optimal use (e.g. to prevent wire tangling or to charge new devices). As discussed above, some fixed coils 546 can be used to provide larger coils, coils with other configuration properties, and to provide structural integrity to table 550.

In some embodiments, each of transmit coils 506 can provide up to a maximum rated power for wireless transfer. In FIG. 6, for example, each of transmit coils 506 can provide up to 40 W of power, from which a total of 120 W of power can be provided to laptop 508. In FIG. 7, for example, a total power, for example 320 W, can be distributed between various devices placed on charging table 550.

Figure 8:
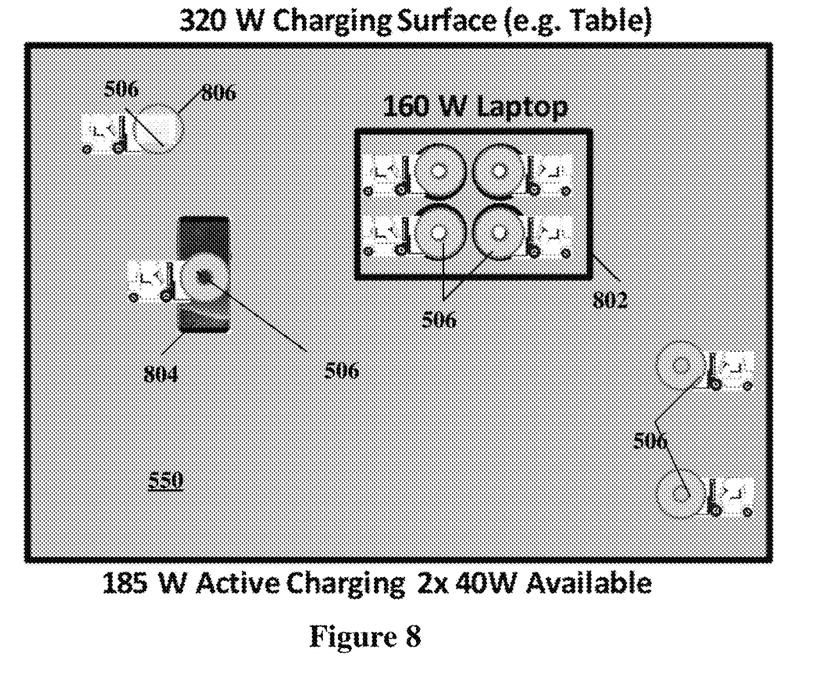
FIG. 8 illustrates an example table configuration according to some embodiments.

FIG. 8 illustrates another example of charging table 550 where transmit coils 506 are positioned to charge a laptop 802, a cell phone 804, and a wearable device 806 that have been freely positioned on the surface of table 550. As shown in FIG. 8, placing a laptop 802, a phone 804, and a wearable device 806 on table 550 results in positioning of movable transmit coils 506 appropriately to charge those devices. In particular, four transmit coils 506 are positioned to charge laptop 802. In that case, for example, 160 W of charging power can be provided to laptop 802 by the parallel electrical configuration of transmit coils 506 positioned proximate to laptop 802. Similarly, another movable transmit coil 506 can be positioned to provide wireless power to phone 804 and yet another movable transmit coil 506 is positioned to provide wireless power to wearable device 806. Each of these devices, through communications wireless power transmitter 500, can communicate its wireless power requirements and the appropriate ones of transmit coils 506 driven appropriately to drive that power requirement. As illustrated in FIG. 8, for example, laptop 802 can request to receive 160 W of wireless power and each of transmit coils 506 positioned proximate to laptop 802 are driven to provide that power (40 W of power each). Similarly, phone 804 and wearable device 806 receive power as requested. Unengaged ones of transmit coils 506 can be idle and engaged only to sense the presence of position of additional devices. As an example, a charging table 550 that can provide 320 W of charging can be distributed as illustrated in FIG. 8 so that two 40 W transmit coils 506 are idled, and the remaining transmit coils 506 are arranged to provide power to other devices as requested by the device. In the example illustrated in FIG. 8, a total of 185 W of power (out of 320 W available) is used to charge devices.

Figure 9:
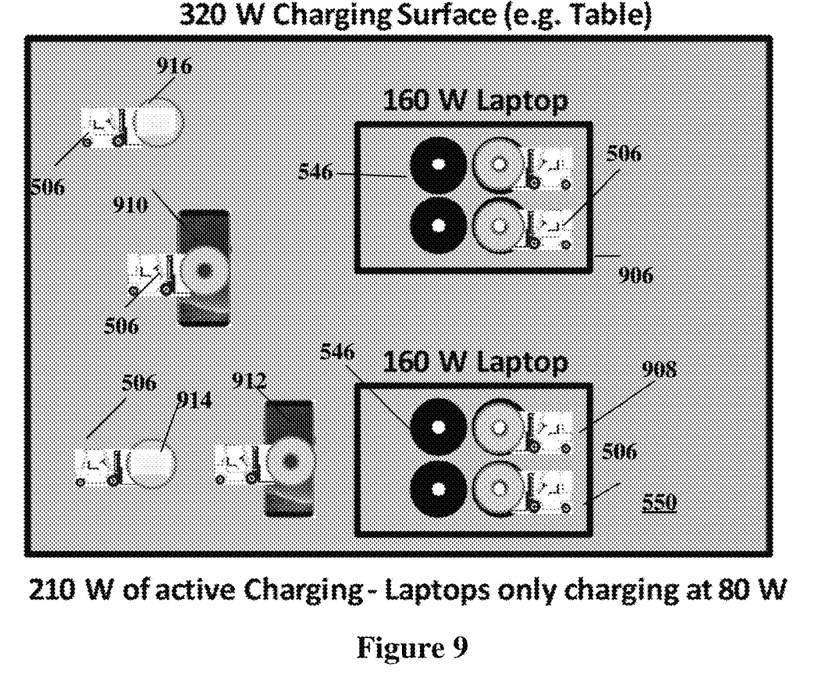
FIG. 9 illustrates an example table configuration according to some embodiments.

FIG. 9 illustrates another example configuration of table 550. The Example of table 550 illustrated in FIG. 9 includes fixed location transmit coils 546 that can help accommodate multiple laptops 906 and 908. Movable transmit coils 506 are positioned to help charge laptops 906 and 908, phones 910 and 912, and wearables 914 and 916 as those devices are placed on the surface of table 550. As is illustrated in FIG. 9, each of laptops 906 and 908 are placed on table 550 proximate to fixed coils 546 and movable coils 506 are then directed to positions to engage laptops 906 and 908. Phones 910 and 912 are placed freely and available transmit coils 506 are positioned to provide power to phones 910 and 912. Similarly, available transmit coils 506 are positioned to engage wearable devices 914 and 916 that are freely positioned on the surface of table 550.

As discussed above, magnetically active devices are detected when placed on the surface of table 550. The location of these devices on table 550 is detected by detectors in table 550. Transmitter 500 then positions one or more transmit coils 506 to the location of devices placed on table 550. For each of the devices, one of transmit coils 506 interrogates the device to receive requested power requirements, and then begins a power transfer if a valid power contract is established between wireless power transmitter 500 and a wireless receiver device. Once power requirements are determined, additional coils 506 can be moved proximate to the device and electrically coupled parallel (e.g. 3 additional transmit coils for 160 W laptop charging) to charge the device.

Transmit coils 506 that are currently engaged with one device can be moved to another device. If two laptops are present, for example, then multiple ones of the coils 506 can be moved on table 550 so that each of the laptops can be charged. In some cases, some coils that are positioned to charge a first laptop can be moved to charge a second laptop to provide power to both devices simultaneously. Wireless transmitter 500 with charging table 550 can then dynamically move transmit coils 506 as needed to best charge all of the devices placed on table 550.

In some embodiments, some fixed coils 546 may be used and may provide structural support for charging surface. Examples illustrated in FIGS. 8 and 9 show a 320 W based on 8 40 W movable transmit coils 506. FIG. 9 also illustrates four (4) fixed coils, each of which can themselves by 40 W coils. Actual number of coils 506 and power capabilities can and will differ. Different coil types are also possible (Dedicate phone, Wearable, laptops). Advanced charging concepts are possible (e.g. if a Phone reaches full charge the associate PTx coil may move to another device for a period of time to boost the charging rate of the other device).

Figure 10:
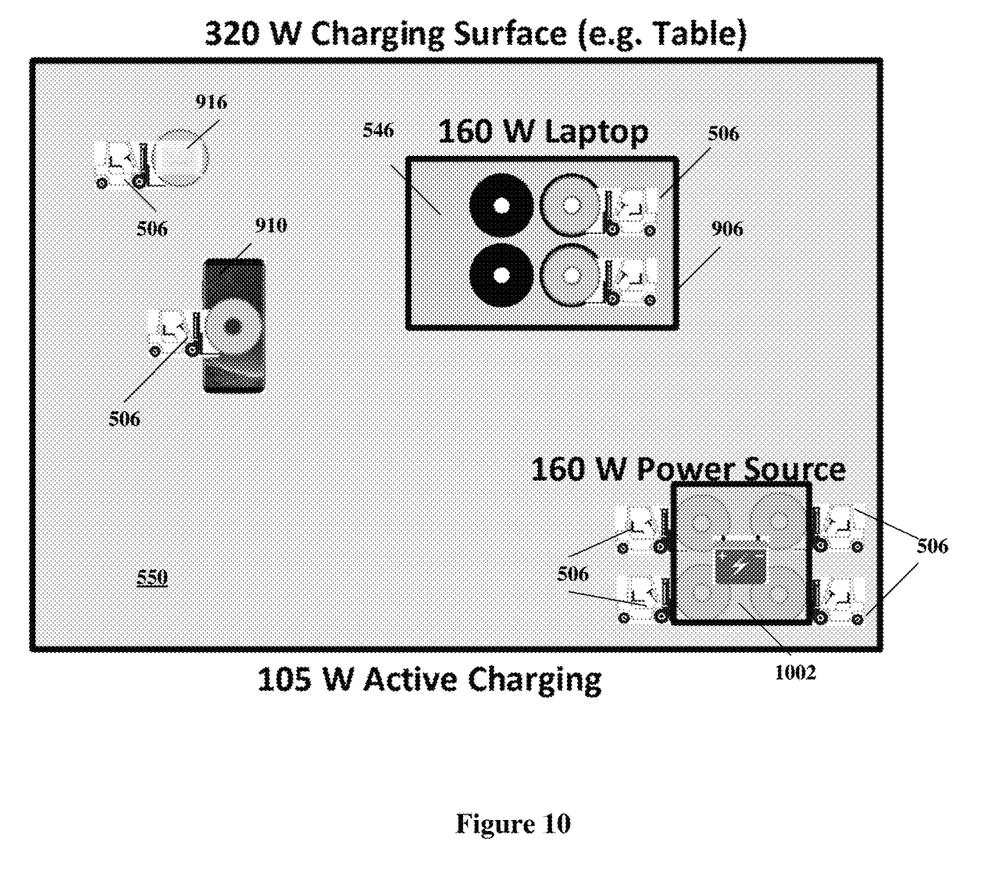
FIG. 10 illustrates an example table configuration according to some embodiments.

FIG. 10 illustrates another configuration of charging surface 550. As shown in FIG. 10 laptop 906 and phone 910 being charged. As illustrates, movable coils 506 are positioned to charge these devices. FIG. 10 also illustrates some fixed coils 546 on which laptop 906 is positioned. In some embodiments, as illustrated in FIG. 10, a power source 1002 is positioned on table 550 and provide a source of wireless power. As indicated in FIG. 10, wireless power from power source 1002 is received into wireless power transmitter 500 and redistributed to charging of laptop 906 and phone 910. In some embodiments, coils 506 are positioned related to power source 1002 and configured to receive wireless power from power source 1002.

In some embodiments, coil positioner 510 of wireless power transmitter 500 is incorporated in table 550 and receive power that can be dynamically redistribute to other coils 506 or 546 as devices charge. This arrangement allows standalone operation. Receive coils for wireless power receiver devices can be positioned on a top or bottom surface of the table. Further, surfaces can be hermetically sealed against harsh environments. Movable transmit coils 506 are mounted on translation stages 564 that allow controlled positioning of the transmit coils 506 within table 550.

Figure 11:
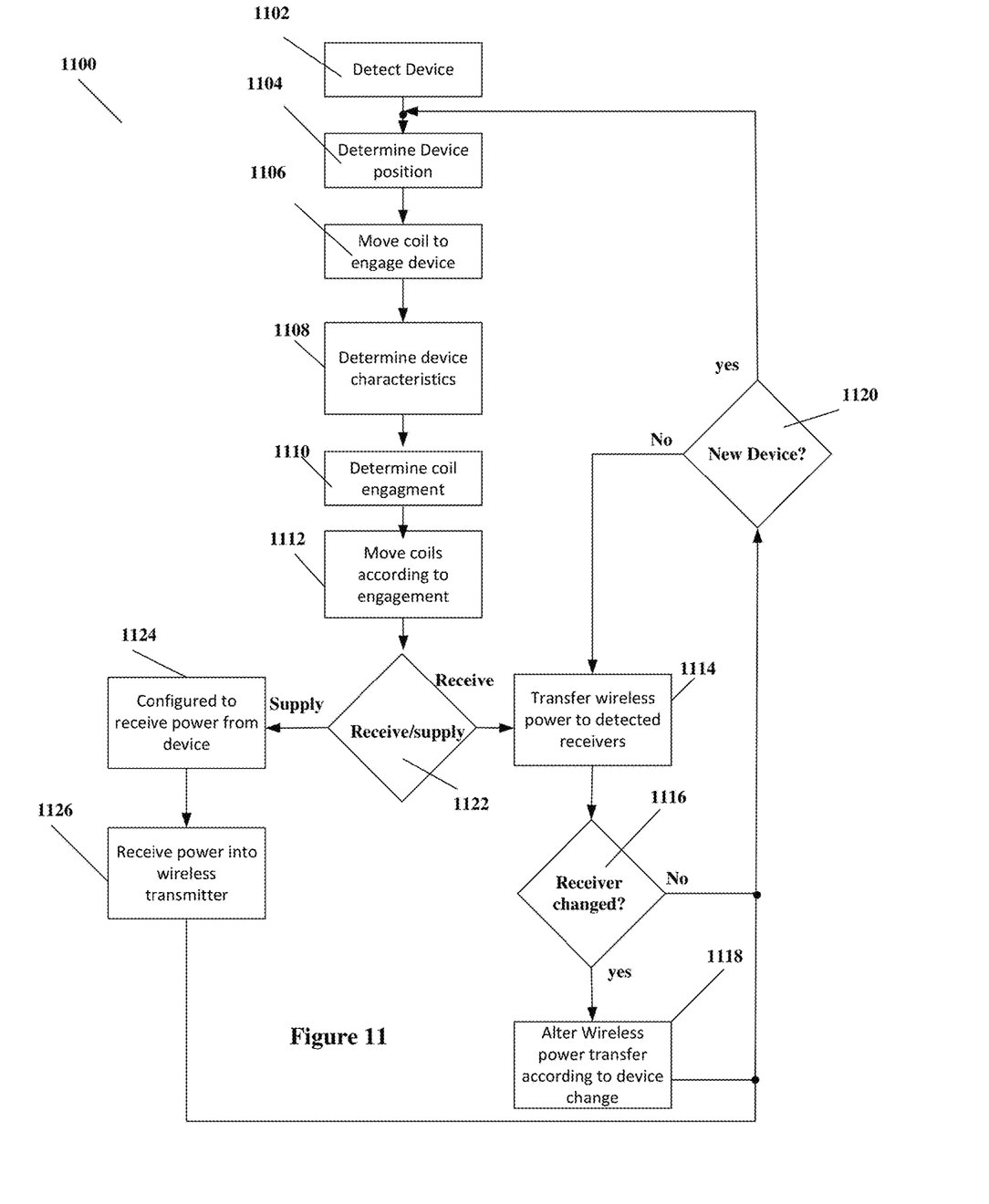
FIG. 11 illustrates a process that may be executed with the wireless power transmitter as illustrated in FIG. 5A.

FIG. 11 illustrates a process 1100 for operating a charging surface table 550 according to some embodiments. Process 1100 may, for example, be executed by processor 520 in controller 504. Process 1100 starts in step 1102 where a device is detected on the charging surface of table 550 from sensor signals received in sense signals 508. In step 1104, the position of the device is determined by controller 504 from sensor signals input to sensor block 508. In step 1106, provided that a fixed coil is not already in place, a movable coil 506 is positioned relative to the device to provide communications between the device and wireless power transmitter 500. In step 1108, wireless power transmitter 500 communicates with the device to determine the device configuration. The device configurations can include, for example, whether the device is a power source as illustrated in FIG. 11 or a wireless power receiver, the power requirements of the device, and other parameters. In step 1110, wireless power transmitter 500 determines a coil configuration for use with the device. In step 1112, the coil configuration is achieved, for example by moving additional coils to engage with the device if needed to meet the coil configuration.

In step 1122, wireless power transmitter 500 determines whether the device is a power supply or a wireless power receiver. If the device is a power supply, then process 1100 proceeds to step 1124. In step 1114, wireless power transmitter 500 is configured to receive power through the transmit coils 506 that are positioned proximate to the power supply device. In step 1126, wireless power transmitter 500 receives power from the power supply device. If, in step 1124, wireless power supply has been removed, then wireless power transmitter 500 is reconfigured to reduce the power received or to stop receiving power.

If in step 1122, wireless power transmitter 500 determines that the power supply is a wireless power receiver and process 1100 proceeds to step 1114. In step 1114, wireless power transmitter 500 powers the coils engaged with the receiver device to transfer power to the receiver device. In step 1116, wireless power transmitter checks to see if the receiver device has been removed or if the power requirements of the receiver device have been changed. If no, then process 1100 proceed to step 1120. If yes, the process 1100 proceeds to step 1118 where wireless power transfer is halted if the receiver device has been removed or power is redistributed if the power requirements have changed. In step 1120, wireless power transmitter 500 determines whether a new receiver has been placed on the charging surface. If yes, then process 1100 proceeds to step 1104. If no, then process 1100 proceed to step 1114 to continue charging the devices that are already placed.

Process 1100 may concurrently execute steps 1124 and 1126 for each power supply device that is placed on table 550. Further, process 1100 may execute steps 1114-1118 concurrently for each receiver device that is placed on table 550.

The discussion of process 1100 above illustrates charging of receive coils placed on the charging surface. However, in some embodiments, the receiver requirements determined in step 1108 are to transmit power to another device positioned on the charging surface. In that situation, in transfer step 1114 and step 1110, wireless power transmitter 500 is configured to transfer wireless power from one receiver to another.

Consequently, embodiments according to this disclosure provide for a universal wireless charging surface with placement freedom using one or multiple common or unique movable transmit coils. A wireless power transmitter incorporated with the wireless charging surface can detect magnetically active objects placed on its surface and determine the placement position of those objects. Movable coils can then align with the target object and send power to valid PRx receiving coils. Fixed coils may also be used for structure support surface top. In some embodiments, coils can be moved to redistribute power when new devices are detected. Laptop or other large power device may use multiple PRx coils to increase received power.

This methodology enables elegant coil power redistribution if large numbers of devices are placed on the charging surface. Advanced charging may be available in some embodiments. For example, when devices are full, associated coils can be temporarily reassigned to devices with additional power requirements.

Surface coils may also have the option to receive power. The coils may be common or dedicated coil types. Consequently, wireless power transmitter may facilitate redistribution of power from one device to another.

The attached appendix is a PowerPoint presentation that provides further disclosure of embodiments according to this disclosure. The appendix is to be considered a part of this disclosure and is herein incorporated by reference in its entirety.

Embodiments of the invention described herein are not intended to be limiting of the invention. One skilled in the art will recognize that numerous variations and modifications within the scope of the present invention are possible. Consequently, the present invention is set forth in the following claims.

What is claimed is:

1. A wireless power transmitter, comprising:
a charging table;
a plurality of movable transmitter coils incorporated into the charging table; and
a control circuit coupled to sensors in the charging table and to the plurality of movable coils, the control circuit being configured to
detect a device placed on the charging table,
determine a position of the device,
move at least one of the plurality of movable transmitter coils to engage the device,
communicate with the device to determine device characteristics, the device characteristics including a requested power requirement,
further configure the plurality of movable coils to engage with the device wherein additional ones of the plurality of movable coils are moved proximate to the device if needed to meet the requested power requirement, and
engage the device according to the device characteristics to charge the device.

2. The wireless power transmitter according to claim 1, wherein the device is a power supply, and wherein the control circuit engages the device by receiving power from the device.

3. The wireless power transmitter according to claim 1, wherein the device is a receiver device, and wherein the control circuit engages the device by providing wireless power to the receiver device.

4. The wireless power transmitter of claim 1, further including a coil positioner coupled to the plurality of movable transmitter coils, the coil positioner receiving signals from the control circuit that determine positions of each of the plurality of movable transmitter coils.

5. The wireless power transmitter of claim 1, further including one or more fixed coils.

6. The wireless power transmitter of claim 4, wherein the control circuit includes
a controller coupled to provide signals to the coil positioner;
a power source coupled to the coil positioner and configured to provide or receive power from the plurality of movable transmitter coils according to signals from the controller; and
a sensor block configured to receive signals from the plurality of movable transmitter coils and the charging table, the sensor block providing detection signals to the controller.

7. The wireless power transmitter of claim 5, further including one or more fixed coils coupled through a fixed coil block to the power source, the controller, and the sensor block.

8. The wireless power transmitter of 6, wherein the controller includes a processor that executes instructions stored in a memory to provide the signals to the coil positioner.

9. The wireless power transmitter of claim 1, wherein each of the plurality of movable transmit coils includes a transmit coil mounted on a translation stage configured to controllably move the transmit coil according to signals to configure the plurality of movable coils.

10. A method of operating a wireless power transmitter, comprising:
detecting a device placed on a surface of a charging table;
determining a position of the device;

moving at least one of a plurality of movable transmit coils that are incorporated in the charging table to engage the device;

communicating with the device to determine device characteristics, the device characteristics including a requested power requirement;

configuring the plurality of movable transmit coils relative to the device according to the device characteristics, wherein configuring the plurality of movable transmit coils includes moving additional ones of the plurality of movable coils proximate to the device if needed to meet the requested power requirement; and engaging the device according to the device characteristics.

11. The method of claim 10, wherein the device characteristics indicate that the device is a power supply, and wherein engaging the device includes configuring to receive power from the device; and receiving power from the device according to the device characteristics.

12. The method of claim 10, wherein the device characteristics indicate that the device is a power receiver, and engaging the device includes transmitting wireless power according to the device characteristics; and determining changes in the device characteristics.

13. The method of claim 10, wherein configuring the plurality of movable transmit coils includes considering at least one fixed transmit coil incorporated in the charging table.

14. The method of claim 10, wherein the device is a laptop and configuring the plurality of transmit coils includes moving at least two of the plurality of transmit coils to engage the laptop.

15. The method of claim 10, wherein detecting the device includes receiving signals from the charging table that indicate presence of the device.

16. The method of claim 15, wherein the signals include signals from one or more of the plurality of movable transmit coils.

17. The method of claim 15, wherein the signals include signals associated with the charging table.

18. The method of claim 15, wherein the signals include signals associated with fixed coils in the charging table.

19. The method of claim 10, wherein the plurality of transmit coils are configured on translation stages that are moved according to received signals.

* * * * *